United States Patent Office 3,212,248
Patented Oct. 19, 1965

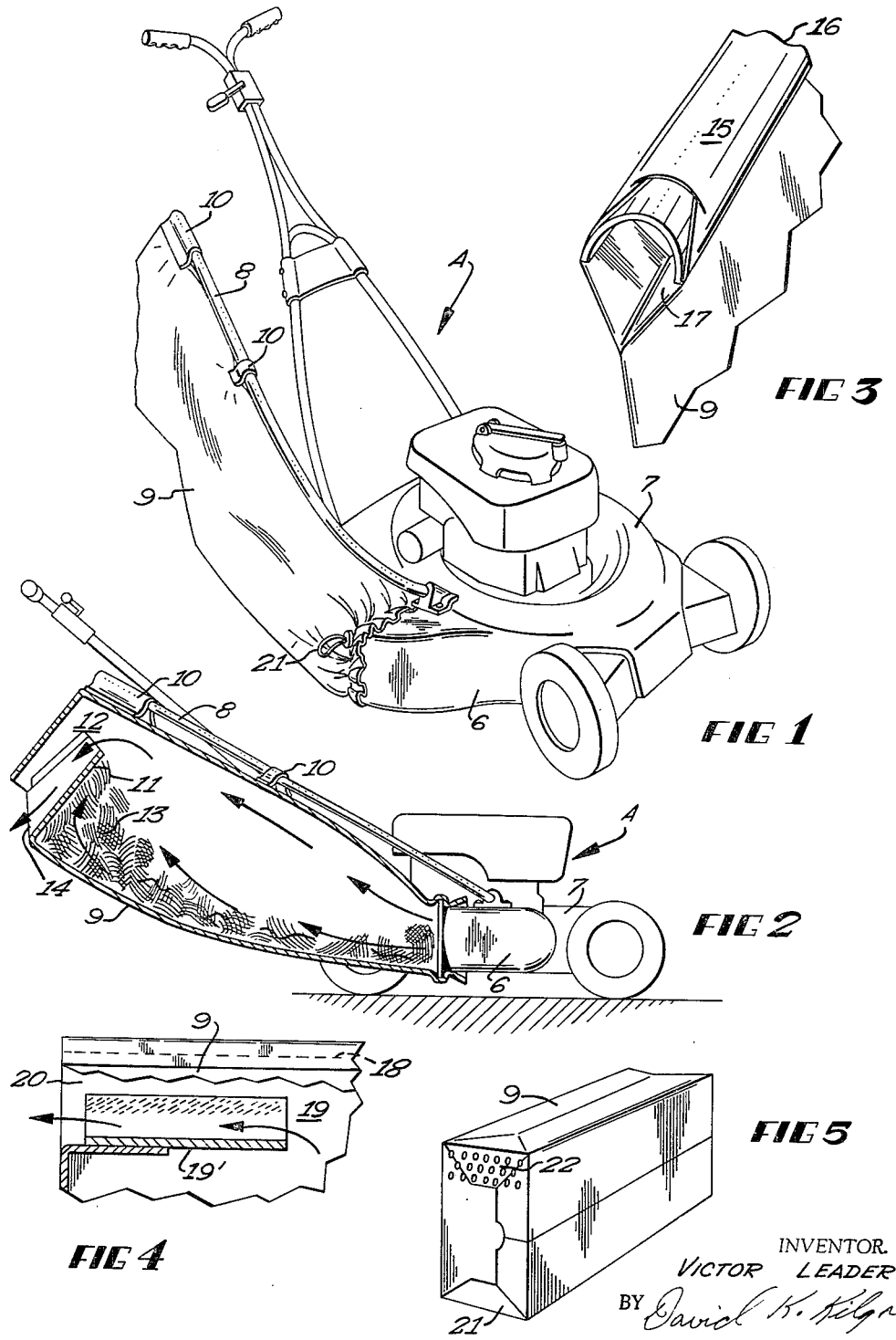

3,212,248
GRASS CUTTINGS AND DEBRIS CATCHER BAG ATTACHMENT FOR ROTARY TYPE POWER MOWERS
Victor Leader, Minneapolis, Minn., assignor to Leader Farms, Inc., Minneapolis, Minn., a corporation of Minnesota
Filed Mar. 4, 1964, Ser. No. 349,429
7 Claims. (Cl. 56—202)

This invention relates broadly to grass cuttings and debris catcher bag attachments for rotary type power mowers of the type embodying a horizontally disposed cutter blade revolving within a housing and having a laterally disposed discharge passageway.

The principal object of this invention is to provide a grass cuttings and debris catcher bag attachment for rotary type power lawn mowers said catcher bag having baffle means formed therein to interrupt the flow of grass cuttings and debris discharged thereinto and still permit a free circulation of unburdened air therethrough even when said catcher bag is filled substantially with said cuttings and debris.

A further object of this invention is to provide a catcher bag attachment for rotary type power lawn mowers that may be readily attached and detached from said mower and is supported thereby.

A still further object of this invention is to provide a catcher bag attachment for rotary type power lawn mowers that is rugged and durable as well as being relatively inexpensive to manufacture thereby affording a catcher bag that is disposable after limited initial use.

These and other objects of the invention will become apparent from the following specification and claims when taken in conjunction with the appended drawing which forms a part of this application and in which drawing, like characters indicate like parts throughout the several views.

To the above end, generally stated, the invention consists of the following devices and combination of devices hereinafter described and defined in the claims.

In the interest of brevity the term catcher bag will hereinafter be referred to as such and the power mower of the rotary type as the "mower."

Referring to the drawing:

FIG. 1 is a perspective view of a conventional mower with the subject catcher bag secured thereto.

FIG. 2 is a side elevational view of the same some parts being broken away and sectioned.

FIG. 3 is a fragmentary view of the catcher bag showing one embodiment of the baffle means.

FIG. 4 is also a fragmentary view of the catcher bag showing a still further embodiment of the said baffle means and, FIG. 5 is a view of a still further modification of the invention.

Referring now more particularly and specifically to the drawing, the reference character A is directed to the mower as an entirety, said mower having a laterally disposed passageway 6 having communication with a cutter blade housing 7 and a catcher bag supporting arm 8 secured at its lower end portion to the blade housing 7.

It is not thought to be necessary to make specific reference to other conventional elements of the mower, as they are not pertinent to the subject invention.

The reference numeral 9 indicates the catcher bag as an entirety provided with flexible cord means whereby said catcher bag 9 is detachably secured to the outer edge portion of the laterally disposed passageway 6. As one of several suitable expedients, the catcher bag 9 is shown supported through its upper and outer reaches by hanger strap means 10 secured to the catcher bag 9 and positioned thereon to receive the supporting arm 8 thereby suspending the bag from said supporting arm above ground engagement.

One preferred form of the invention is illustrated in FIG. 2 of the drawing wherein baffle means 11 is transversely positioned in the catcher bag 9 adjacent the rear end portion thereof. In this form of the invention the said baffle means 11 affords a complete transverse closure but provides an air passageway 12 between the upper edge portion of the said baffle means and the upper surface of the catcher bag 11. In this view directional arrows indicate the flow of air laden with grass cuttings and debris 13 faced into the catcher bag 9 by the air stream induced by the revolving cutter blade, not shown, and deposited in the said catcher bag via the lateral passageway forming a part of the blade housing 7. By virtue of the baffle means 11 this debris laden air enters the catcher bag and as the said air reaches and strikes the baffle means 11, the debris and cuttings 13 carried thereby is precipitated into the bottom of the catcher bag 9. The air stream continues to flow over the baffle means via the passageway 12 and is returned to atmosphere via an opening to atmosphere 14 formed in the rear end portion of the catcher bag 9, preferably in the extreme lower end portion thereof.

It will be understood that the size of the baffle means 11 is predetermined relative to the interior dimension of the rear end portion of the catcher bag 9 and that generally speaking, the air passageway need not be extensive. Only enough of a passageway is necessary to permit a continuing flow of unburdened air and accordingly there will be little or no grass cuttings or debris 13 carried over the baffle means 11. It will be still further understood that the size of said openings, air passageway, and the baffle are further determined by the size and capacity of the mower A.

It will be obvious that by means of the baffle 11 and the passageway 12 the cuttings and debris 13 carried by the air stream will be deposited over the full length of the catcher bag rather than permitting the same to accumulate in the lateral discharge passageway 6 of the blade housing 7 and in the forward end portion of the catcher bag 9 as is now the case with present bag equipment because of a lack of air circulation through the material of said bag which is now generally formed of a relatively porous material that quickly becomes impregnated with foreign matter after brief use.

FIG. 3 of the drawing illustrates a modification of the baffle means 11, the air escape passageway 12, and the opening to atmosphere 14 in the lower rear end portion of the catcher bag 9. In this modification a tubular or semi-tubular stack 15 is formed in the extreme rear end portion of the catcher bag 9. This stack 15 is in itself actually the baffle means and according to the size and capacity of the mower A to which it is adapted, the said stack may be generally from two to six inches in diameter and the upper end portion thereof extending upwardly in the rear end of the catcher bag 9 to within a relatively short distance of the top portion of the catcher bag 9 to thus provide communication, see numeral 16, of the stack 15 with the interior of the catcher bag 9. The stack 15 is also open at its lower end portion, see numeral 17, and has communication to atmosphere at that point via an opening in the lower rear portion of the catcher bag 9. It will be obvious from the foregoing that the stack 15 acts as a baffle 11 and provides for a circulation of unburdened air over the upper end portion thereof, downwardly via the stack 15 and thence to atmosphere via the lower opening in said stack and the lower opening 17 in the catcher bag 9.

The structure of FIG. 3 described above is preferably produced by assembling the tubular baffle means 11 in the catcher bag 9 by adhesive means, however, it is possible to further produce suitable baffle means 11 in a catcher bag 9 by the expedient illustrated in FIG. 4.

In this FIG. 4 embodiment of the invention the entire rear end portion of the catcher bag 9 is stitched to afford a complete end closure thereof, see numeral 18. Transversely disposed baffle means 19' spaced inwardly of the end closure 18 of the catcher bag 9 affords an elongated air passageway having communication with the interior of the said catcher bag 9 via a port 19 in the upper end portion thereof and an escape passageway to atmosphere via a port 20 in the lower end portion of said passageway. The said air passageway is in the form of a stack and it will be obvious that the same provides a free circulation of air unburdened of grass cuttings and debris over the port 19, through the passageway, and thence to atmosphere via the air escape port 20.

A still further modification of this invention is illustrated in FIG. 5 of the drawing and embodies the use of a type of bag 9 known in the trade as a pasted valve bag. This type of bag has an open mouth and a closed bottom and throughout its entire length has substantially the same cross-sectional dimension.

It will be understood that the bag in this modification will be of a size dictated by the capacity of the mower A to which it is adapted and will be detachably secured to said mower in a longitudinally disposed position with its open mouth engaging the laterally disposed discharge opening 6.

This modification differs substantially from the catcher bag structure previously described in that it does not embody the baffle means 11 as described and shown in FIGS. 2, 3, and 4. Instead of supplemental baffle means affording a barrier and a stack, this modification makes use of the closed rear end portion of the catcher bag 9 to afford a barrier 21 to the passage of grass cuttings and debris 13. In conjunction therewith and to provide for a free circulation of unburdened air, an air passageway 22 is formed in the upper portion of the closed end of the catcher bag. This air passageway 22 may be formed either by perforating the said upper portion of the rear end closure by means of a plurality of spaced holes or by means of a section of mesh-like material adhesively applied to the upper edge of an opening formed in the upper portion of said closure and the top of the catcher bag 9 as the same is supported by the mower A in a horizontally disposed position.

From the foregoing it will be obvious that the air stream induced by the mower A will force the said air stream laden with grass cuttings and debris 13 into the catcher bag 9 and be retained by the catcher bag as said grass cuttings and debris strike the closed barrier at the rear end portion thereof. The air passageway in the upper portion of the barrier 21 will permit for a free circulation of air through the catcher bag 9 via the air passageway 22 to atmosphere.

It has been stated generally herein that as shown in FIG. 1, the forward end portion of the catcher bag 9 is secured to the lateral discharge passageway 6 of the mower A by means of a flexible cord 21', however, it will be understood that the catcher bag 9 may be secured at this point by any number of suitable detachable means.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A grass cuttings and debris catcher attachment for rotary type power mowers having a laterally disposed passageway for the discharge of said grass cuttings and debris, comprising in combination an elongated bag having an open mouth at its forward end portion and means associated with said open mouth of the elongated bag whereby the same may be detachably secured to the laterally disposed discharge passageway of the said power mower and an open port in the bottom of said elongated bag adjacent the rear end portion thereof, baffle means transversely positioned in said elongated bag forwardly of the open port in said bag and extending upwardly thereof into close proximity to the upper portion of said elongated bag thereby providing a vertically disposed air passageway to afford a free circulation of the air stream induced by the power mower over the upper edge portion of the baffle means, downwardly through the said vertically disposed air passageway, and thence to atmosphere via the open port in the lower rear end portion of the bottom of the elongated bag at the root of the said vertically disposed air passageway.

2. The structure of claim 1 wherein the elongated bag has substantially the same cross-sectional dimension substantially rearwardly of its longitudinal center said baffle means spaced forwardly of the rear end portion of the said elongated bag transversely closing the same except for the air passageway between the upper edge portion of the said baffle means and the top portion of the said elongated bag.

3. The structure of claim 1 further including means on the elongated bag whereby the same is longitudinally supported by the power mower.

4. A grass cuttings and debris catcher attachment for rotary type power mowers having a laterally disposed passageway for the discharge of said grass cuttings and debris, comprising in combination an elongated bag having an open closable mouth at its forward end portion and means associated therewith whereby the said elongated bag may be detachably secured to the laterally disposed discharge passageway of the said power mower, an open port in the extreme lower rear end portion of the bottom of said elongated bag and a vertically disposed stack extending upwardly along the rear end portion of the bag from the said open port into relatively close proximity to the upper portion of the bag to thus provide communication of the interior of the elongated bag with atmosphere via the open top of the stack, the stack proper and the open port at the root of said stack.

5. The structure of claim 4 wherein the stack and the open port are of substantially the same cross-sectional dimensions, said stack and open port being dimensioned according to the capacity of the power mower.

6. The structure of claim 4 wherein the stack affords the baffle means and is positioned at the extreme rear end portion of the elongated bag.

7. The structure of claim 4 embodying an elongated bag the rear end portion of which is stitched to close the same, an open port formed in the lower rear end portion thereof and baffle means secured to the side of the said bag and extending upwardly from the forward edge portion of said open port and into relatively close proximity with the upper portion of the said elongated bag to thus afford an unrestricted air passageway between the interior of the bag and atmosphere via the open port.

References Cited by the Examiner

UNITED STATES PATENTS 2,918,694  12/59  Tarrant _____ 56—202 XR
3,006,128  10/61  Weiland _____ 56—194

FOREIGN PATENTS 214,915  4/58  Australia.

ABRAHAM G. STONE, *Primary Examiner.*

ANTONIO F. GUIDA, *Examiner.*